(12) United States Patent
Suto et al.

(10) Patent No.: US 11,941,432 B2
(45) Date of Patent: Mar. 26, 2024

(54) PROCESSING SYSTEM, PROCESSING METHOD, HIGHER-LEVEL SYSTEM, LOWER-LEVEL SYSTEM, HIGHER-LEVEL PROGRAM, AND LOWER-LEVEL PROGRAM

(71) Applicant: Nippon Telegraph and Telephone Corporation, Tokyo (JP)

(72) Inventors: Yuichi Suto, Musashino (JP); Atsushi Takada, Musashino (JP); Aiko Oi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 361 days.

(21) Appl. No.: 17/430,230

(22) PCT Filed: Jan. 31, 2020

(86) PCT No.: PCT/JP2020/003605
§ 371 (c)(1),
(2) Date: Aug. 11, 2021

(87) PCT Pub. No.: WO2020/166374
PCT Pub. Date: Aug. 20, 2020

(65) Prior Publication Data
US 2022/0164219 A1   May 26, 2022

(30) Foreign Application Priority Data
Feb. 15, 2019 (JP) .................. 2019-025416

(51) Int. Cl.
*G06F 9/48* (2006.01)

(52) U.S. Cl.
CPC ................... *G06F 9/485* (2013.01)

(58) Field of Classification Search
CPC . G06F 9/46; G06F 9/48; G06F 9/4806; G06F 9/4837; G06F 9/4843; G06F 9/485;
(Continued)

(56) References Cited

U.S. PATENT DOCUMENTS 6,591,351 B1 * 7/2003 Urabe ................. G06F 11/2074
714/E11.107

FOREIGN PATENT DOCUMENTS

| JP | S5688521 | 7/1981 |
| JP | 2017143452 | 8/2017 |

(Continued)

*Primary Examiner* — Andy Ho
(74) *Attorney, Agent, or Firm* — Fish & Richardson P.C.

(57) ABSTRACT

In asynchronous processing, processing of a low-order system is checked. A high-order system 1 includes a high-order workflow advancing unit 21 that transmits a processing command for asynchronous processing to a low-order system 2, and a notice processing unit 23 that receives, from the low-order system 2, a notice related to a device command to be executed by a device 3 in the asynchronous processing, and updates progress data 13. The low-order system 2 includes a low-order workflow advancing unit 61 that, upon receiving the processing command from the high-order system 1, transmits a device command to the device, and a notification unit 62 that, when transmission of the device command to the device 3 is detected, notifies the high-order system 1 of the identifier of the device to which the device command was transmitted and the device command.

9 Claims, 7 Drawing Sheets

(58) Field of Classification Search
CPC .... G06F 9/4856; G06F 9/4881; G06F 9/4887; G06F 1/329
See application file for complete search history.

(56) References Cited

FOREIGN PATENT DOCUMENTS

| | | |
|---|---|---|
| JP | 2017220134 | 12/2017 |
| JP | 2018190460 | 11/2018 |

\* cited by examiner

12 DICTIONARY DATA

| DEVICE IDENTIFIER | DEVICE COMMAND | NOTATION WORD |
|---|---|---|
| DEVICE A | show | DEVICE STATE CHECK |
| DEVICE A | reboot | DEVICE REBOOT |
| DEVICE A | update | DATA UPDATE |
| ... | ... | ... |

Fig. 4

DATE/TIME: XXXXXXX
IDENTIFIER OF TRANSMISSION SOURCE SYSTEM: XXXXX
IDENTIFIER OF COMMAND EXECUTION DEVICE: XXXX
COMMAND: XXXXX
PARAMETER: XXXXXX
REASON FOR DETERMINATION: XXXXXXXX
. . . . . . . . . . . . . . . . .

PROCESSING SYSTEM, PROCESSING METHOD, HIGHER-LEVEL SYSTEM, LOWER-LEVEL SYSTEM, HIGHER-LEVEL PROGRAM, AND LOWER-LEVEL PROGRAM

CROSS-REFERENCE TO RELATED APPLICATIONS

This application is a National Stage application under 35 U.S.C. § 371 of International Application No. PCT/JP2020/003605, having an International Filing Date of Jan. 31, 2020, which claims priority to Japanese Application Serial No. 2019-025416, filed on Feb. 15, 2019. The disclosure of the prior application is considered part of the disclosure of this application, and is incorporated in its entirety into this application.

TECHNICAL FIELD

The present invention relates to a processing system including a high-order system that processes a high-order workflow and transmits a processing command to a low-order system, and a low-order system that processes a low-order workflow in accordance with the processing command from the high-order system and transmits a device command to a device, and also relates to a processing method, a high-order system, a low-order system, a high-order program, and a low-order program.

BACKGROUND ART

An automated system in which an information processing system copes with failure handling in the information processing system by itself is prevailing. In such a system, an operator (maintenance person) focuses on checking of handling of the system and management when there is an error in the handling of the system, whereby operating expense (OPEX) can be reduced.

In automation, there is a system that presents a reason for determination made by the system to a user (see Patent Literature 1). The system advances processing in accordance with a predetermined flowchart, and presents to the user a reason for the processing at a branch under which the determination by the system was made.

Moreover, there is an orchestrating technique for quickly and efficiently managing a life style cycle including construction, update, and reduction of a network service (see Patent Literature 2).

CITATION LIST

Patent Literature

Patent Literature 1: Japanese Patent Laid-Open No. 2017-220134
Patent Literature 2: Japanese Patent Laid-Open No. 2017-143452

SUMMARY OF THE INVENTION

Technical Problem

In an information processing system, asynchronous processing has been known. In asynchronous processing, a high-order system transmits a request for processing to a low-order system, and then, when the low-order system becomes a state where it can execute the processing, the low-order system processes the request and returns it to the high-order system. In such asynchronous processing, there is a problem that the high-order system cannot grasp how the low-order system makes determination and advances processing.

Accordingly, an object of the present invention is to provide a processing system capable of checking processing performed by a low-order system in asynchronous processing, a processing method, a high-order system, a low-order system, a high-order program, and a low-order program.

Means for Solving the Problem

In order to solve the problem described above, a first feature of the present invention relates to a processing system including a high-order system and a low-order system. The high-order system processes a high-order workflow and transmits a processing command to the low-order system. The low-order system processes a low-order workflow in accordance with the processing command from the high-order system and transmits a device command to a device. In the processing system according to the first feature of the present invention, the high-order system includes a storage device that stores progress data in which an identifier of the device and a device command to be executed by the device are associated with each other, a high-order workflow advancing unit that transmits a processing command for asynchronous processing to the low-order system, and a notice processing unit that receives, from the low-order system, a notice related to the device command to be executed by the device in the asynchronous processing, and updates the progress data. The low-order system includes a low-order workflow advancing unit that, upon receiving the processing command from the high-order system, transmits the device command to the device, and a notification unit that, when transmission of the device command to the device is detected, notifies the high-order system of the identifier of the device to which the device command was transmitted and the device command.

The storage device of the high-order system may store dictionary data in which the identifier of the device, the device command of the device, and a notation word of the device command are associated with one another, and the notice processing unit may convert the device command received from the low-order system into the notation word, and update the progress data.

The low-order workflow advancing unit may update log data upon transmission of the device command to the device, and the notification unit may refer to the log data to detect the transmission of the device command to the device.

A second feature of the present invention relates to a processing method used in a processing system including a high-order system and a low-order system. The high-order system processes a high-order workflow and transmits a processing command to the low-order system. The low-order system processes a low-order workflow in accordance with the processing command from the high-order system and transmits a device command to a device. The processing method according to the second feature of the present invention includes the steps of, by the high-order system, transmitting a processing command for asynchronous processing to the low-order system, by the low-order system, upon receiving the processing command from the high-order system, transmitting a device command to the device, when transmission of the device command to the device is detected, by the low-order system, notifying the high-order system of an identifier of the device to which the device command was transmitted and the device command, and by the high-order system, receiving, from the low-order system, a notice related to the device command to be executed by the device in the asynchronous processing, and updating progress data in which the identifier of the device and the device command to be executed by the device are associated with each other.

A third feature of the present invention relates to a high-order system used in a processing system including a high-order system and a low order system. The high-order system processes a high-order workflow and transmits a processing command to the low-order system. The low-order system processes a low-order workflow in accordance with the processing command from the high-order system and transmits a device command to a device. The high-order system according to the third feature of the present invention includes a storage device that stores progress data in which an identifier of the device and a device command to be executed by the device are associated with each other, a high-order workflow advancing unit that transmits a processing command for asynchronous processing to the low-order system, and a notice processing unit that receives, from the low-order system, a notice related to the device command to be executed by the device in the asynchronous processing, and updates the progress data.

A fourth feature of the present invention relates to a low-order system used in a processing system including a high-order system and the low-order system. The high-order system processes a high-order workflow and transmits a processing command to the low-order system. The low-order system processes a low-order workflow in accordance with the processing command from the high-order system and transmits a device command to a device. The low-order system of the fourth feature of the present invention includes a low-order workflow advancing unit that, upon receiving a processing command for asynchronous processing from the high-order system, transmits a device command to the device, and a notification unit that, when transmission of the device command to the device is detected, notifies the high-order system of the identifier of the device to which the device command was transmitted and the device command.

A fifth feature of the present invention relates to a high-order program that causes a computer to function as the high-order system according to the third feature of the present invention.

A sixth feature of the present invention relates to a low-order program that causes a computer to function as the low-order system according to the fourth feature of the present invention.

Effects of the Invention

According to the present invention, it is possible to provide a processing system capable of checking the processing performed by a low-order system in asynchronous processing, a processing method, a high-order system, a low-order system, a high-order program, and a low-order program.

DESCRIPTION OF EMBODIMENTS

Next, an embodiment of the present invention will be described with reference to the drawings. In the below description of the drawings, the same or similar parts are denoted by the same or similar reference numerals.

(Processing System)

Figure 1:
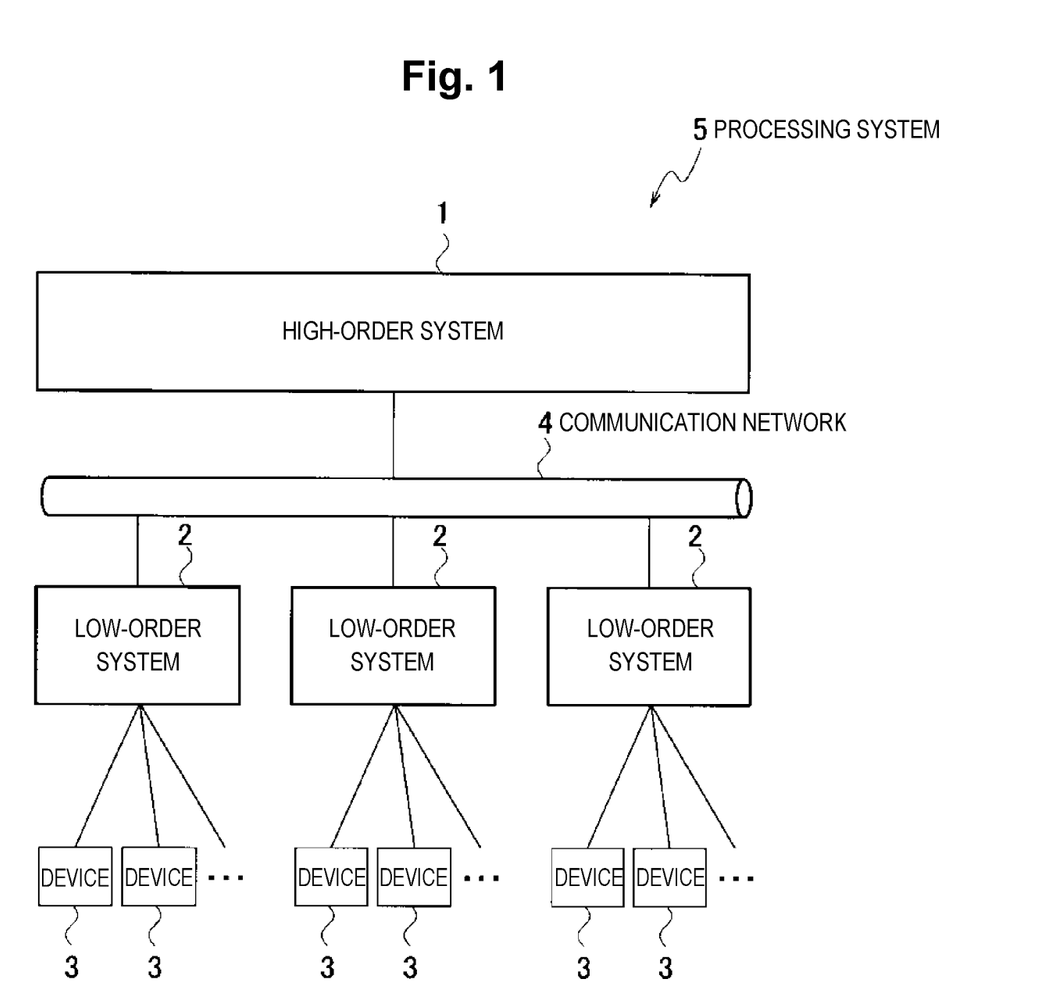
FIG. 1 is a diagram illustrating a system configuration of a processing system according to an embodiment of the present invention.

A processing system 5 according to an embodiment of the present invention will be described with reference to FIG. 1. The processing system 5 includes a high-order system 1, a low-order system 2, and a device 3. The high-order system 1 and the low-order system 2 are communicably connected to each other by a communication network 4. The low-order system 2 and the device 3 accommodated in the low-order system 2 are connected to each other.

The high-order system 1 operates as a controller of the processing system 5, and controls processing of the entire processing system 5. The high-order system 1 processes a high-order workflow, and transmits a processing command to the low-order system.

The low-order system 2 operates the device 3 in accordance with an instruction from the high-order system 1. The low-order system 2 processes a low-order workflow in accordance with a processing command from the high-order system 1, and transmits a device command to the device 3. The number of low-order systems 2 and the number of devices 3 illustrated in FIG. 1 are not limited.

The device 3 is accommodated in the low-order system 2, and operates in accordance with a device command transmitted from the low-order system 2. The device 3 executes the device command transmitted from the low-order system 2, and returns the execution result to the low-order system 2.

While the embodiment of the present invention has a two-layer structure including the high-order system 1 and the low-order system 2, it is applicable to any structure having three or more layers. Moreover, a command transmitted from the high-order system 1 to the low-order system 2 is referred to as a processing command, and a command transmitted from the low-order system 2 to the device 3 is referred to as a device command.

(High-Order System)

Figure 2:
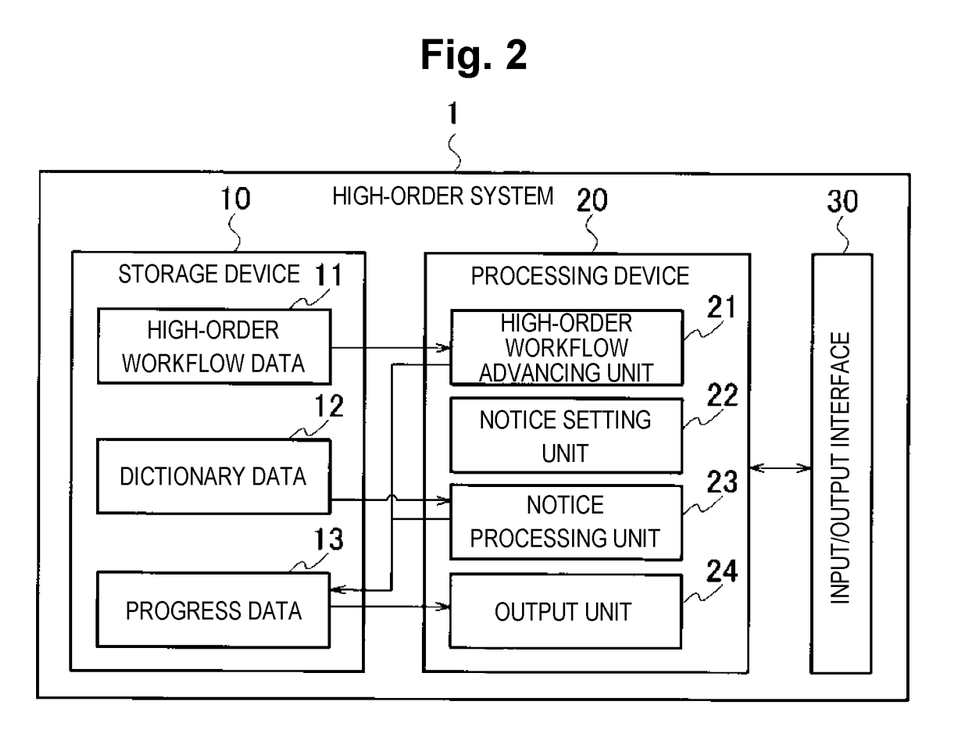
FIG. 2 is a diagram illustrating a hardware configuration and function blocks of a high-order system according to an embodiment of the present invention.

The high-order system 1 according to the embodiment of the present invention will be described with reference to FIG. 2. The high-order system 1 includes a storage device 10, a processing device 20, and an input/output interface 30. The high-order system 1 may be one computer incorporating the storage device 10, the processing device 20, and the input/output interface 30, or a virtual computer formed of a plurality of units of hardware. The functions illustrated in FIG. 2 are implemented through execution of a high-order program by such a computer.

The storage device 10 is a read only memory (ROM), a random access memory (RAM), a hard disk, or the like, and stores various types of data such as input data, output data, intermediate data, and the like for execution of processing by the processing device 20. The processing device 20 is a central processing unit (CPU), which reads and writes data stored in the storage device 10 and inputs and outputs data with the input/output interface 30 to thereby execute processing in the high-order system 1. The input/output interface 30 may be an interface for the high-order system 1 to communicably connect to the low-order system 2 or the like or to connect to an input device and an output device.

The storage device 10 stores a high-order program, and stores high-order workflow data 11, dictionary data 12, and progress data 13.

The high-order workflow data 11 is data in which a workflow to be performed by the high-order system 1 is stored in a computer-readable form. The high-order system 1 refers to the high-order workflow data 11 to perform processing through appropriate determination based on information held by the high-order system 1 or available information.

Figure 3:
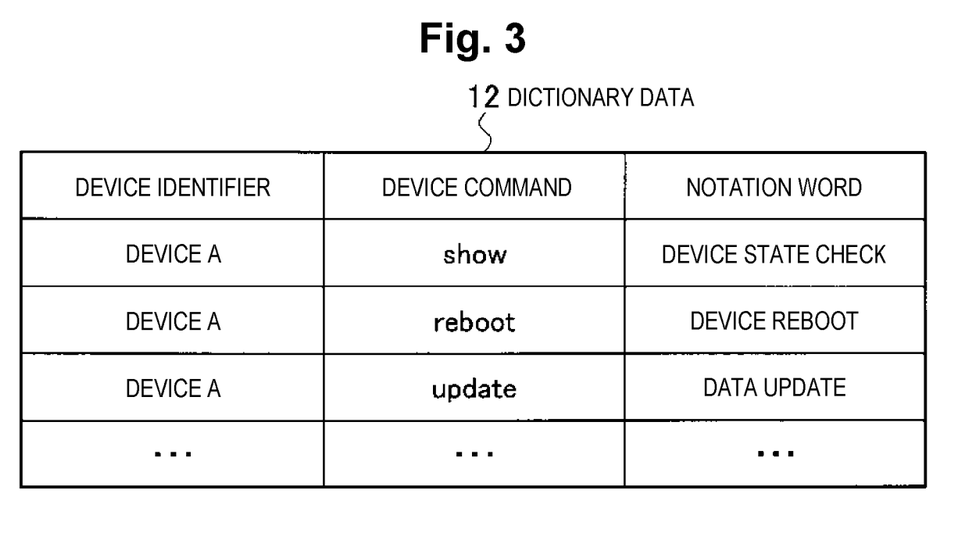
FIG. 3 is a diagram illustrating a data structure and exemplary data of dictionary data.

The dictionary data 12 is data in which an identifier of the device 3, a device command of the device 3, and a notation word of the device command are associated with one another, as illustrated in FIG. 3. The high-order system 1 according to the embodiment of the present invention is able to acquire a history of device commands transmitted from the low-order system 2 to the device 3 and display it to the operator. However, a device command is described in a format depending on the device, and the operator may not be able to understand easily. Therefore, the high-order system 1 converts a device command into a notation word easily understandable by the operator, with use of the dictionary data 12. For example, a device command "show" is converted into a notation word "device state check", a device command "reboot" is converted into a notation word "device reboot", and a device command "update" is converted into a notation word "data update".

The progress data 13 is data in which an identifier of the device 3 and a device command to be executed by the device 3 are associated with each other. The progress data 13 is data of the history of device commands transmitted from the low-order system 2 to the device 3. A device command recorded in the progress data 13 may be a notation word converted with use of the dictionary data 12. While description will be given on the case where the progress data 13 is log data of the device 3, it may also be log data of the high-order system 1 and the low-order system 2.

Figure 4:
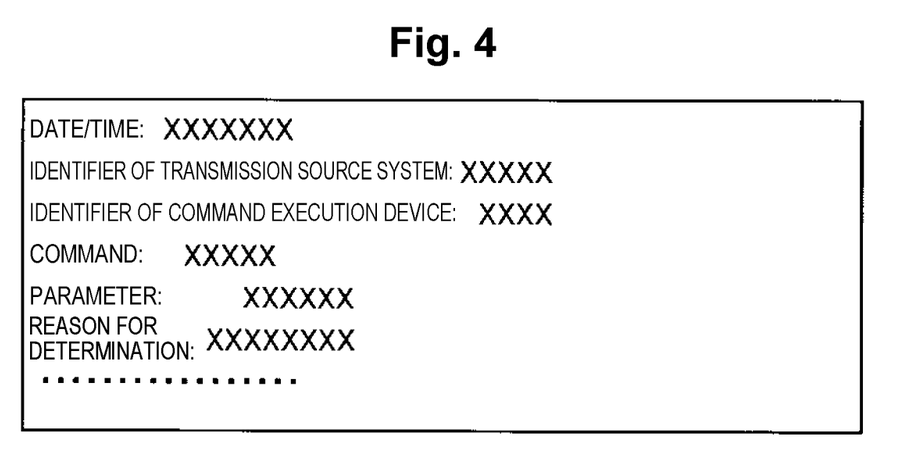
FIG. 4 illustrates an example of a notification content received by a high-order system from a low order system.

The progress data 13 includes data items of a notice received from the low-order system 2. As illustrated in FIG. 4 for example, the progress data 13 includes items such as notified date/time, an identifier of a transmission source system (low-order system 2), an identifier of a command execution device, a command, a parameter, a reason for determination, and the like.

The processing device 20 includes a high-order workflow advancing unit 21, a notice setting unit 22, a notice processing unit 23, and an output unit 24.

The high-order workflow advancing unit 21 advances processing in accordance with the high-order workflow data 11. The high-order workflow advancing unit 21 transmits an asynchronous processing command to the low-order system 2.

An asynchronous processing command is a command in which, after transmission of a processing request by the high-order system 1 to the low-order system 2, the request is processed when the low-order system 2 becomes a state capable of executing the process, and a processing result is returned to the high-order system. In the case where a result of processing by the low-order system 2 is not required immediately such as the case where the high-order system 1 performs different processing after transmission of the processing request to the low-order system 2, the low-order system 2 is not necessary to perform the processing immediately after receiving the request from the high-order system 1. In contrast, a synchronous processing command is a command in which the high-order system 1 waits for a result of processing by the low-order system 2 after transmission of a processing request from the high-order system 1 to the low-order system 2 so that the low-order system 2 needs to return a processing result immediately.

In the embodiment of the present invention, description is given with a focus on the case where the high-order workflow advancing unit 21 transmits an asynchronous processing command to the low-order system 2. However, the embodiment does not eliminate the case of transmitting a synchronous processing command.

The notice setting unit 22 transmits an instruction to set a notification unit 62, to the low-order system 2. The low-order system 2 sets the notification unit 62 in accordance with the instruction by the notice setting unit 22. At this time, the notice setting unit 22 set notice conditions such as the type of device command to be notified to the high-order system 1 by the notification unit 62 and notice items. The notice setting unit 22 may instruct deletion of the notification unit 62 of the low-order system 2. Also, the notice setting unit 22 may instruct update of the previously set notice conditions.

Note that in the embodiment of the present invention, it is only necessary that the notification unit 62 is set in the low-order system 2. Any method may be used for setting the notification unit 62 in the low-order system 2. For example, the notice setting unit 22 may transmit an instruction of setting the notification unit 62 to the low-order system 2, and the low-order system 2 may set the notification unit 62 in accordance with the instruction from the high-order system 1. Alternatively, the notification unit 62 may be set in the low-order system 2 regardless of an instruction from the high-order system 1, such as the notification unit 62 being set voluntarily by the low-order system 2 or the notification unit 62 being set at the time of installing the low-order system 2.

The notice processing unit 23 receives, from the notification unit 62 of the low-order system 2, a notice related to a device command to be executed by the device 3 in asynchronous processing, and updates the progress data 13. As illustrated in FIG. 4, the notice related to a device command received by the notice processing unit 23 includes date/time, an identifier of a transmission source system (low-order system 2), an identifier of a command execution device, a command, a parameter, a reason for determination, and the like.

The parameter is a parameter required for execution of a command, such as information specifying a subject that executes the command or setting information required for execution. The reason for determination is a reason for causing the device 3 to execute the command in the low-order system 2. In the low-order system 2, a workflow is prepared for automation or the like in failure handling. The low-order system 2 specifies, as a reason for determination, the circumstances of causing the device 3 to execute the device command from the workflow, and notifies the high-order system 1 of the specified reason for determination.

The notice processing unit 23 stores, in the progress data 13, a notice from the low-order system 2 in a form that can be searched or extracted for each item. The notice processing unit 23 may convert a device command received from the low-order system 2 into a notation word, and update the progress data 13. For example, in the case where a notice received from the low-order system 2 includes a device command "show", the notice processing unit 23 refers to the dictionary data 12 to convert it into a notation word "device state check", and updates the progress data 13. Note that the notice processing unit 23 may record not only a notation word but also a device command, in the progress data 13.

The output unit 24 outputs each piece of data of the progress data 13 to an output device via the input/output interface 30 to notify the operator. For example, the output unit 24 may output data related to the progress data 13 when a predetermined condition is satisfied such that a predetermined time elapses or predetermined processing ends. Further, the output unit 24 outputs data conforming to the condition input by the operator to the output device via the input/output interface 30 to notify the operator.

The output unit 24 may also set the granularity of information to be output, according to the preset rule, a rule designated by the operator, or the like. In the case where fine granularity is set, the output unit 24 outputs, as a reason for determination, a detailed reason based on the service level agreement (SLA) information and comparison. Specifically, the output unit 24 outputs as follows: "the best effort broadband service, the affected number of users is less than 1,000, but since the handling time limit expires, handle with high priority. As this is the first failure handling, automatic handling (device reboot) is selected first". Meanwhile, when course granularity is set, the output unit 24 outputs a simplified reason such as "high priority".

(Low-Order System)

Figure 5:
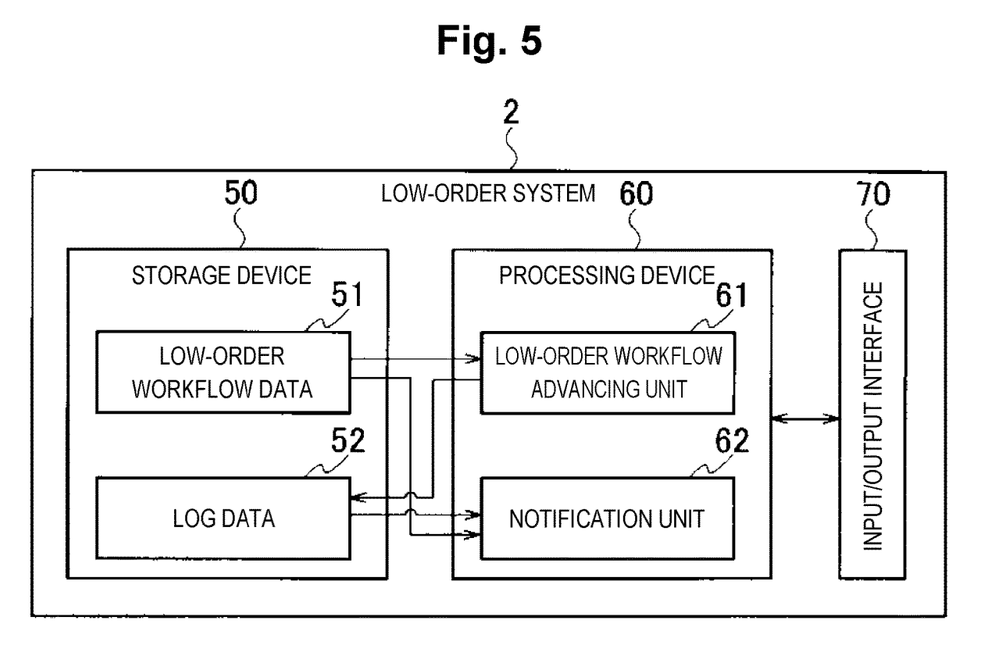
FIG. 5 is a diagram illustrating a hardware configuration and function blocks of a low-order system according to an embodiment of the present invention.

The low-order system 2 according to the embodiment of the present invention will be described with reference to FIG. 5. The low-order system 2 includes a storage device 50, a processing device 60, and an input/output interface 70. The low-order system 2 may be one computer incorporating the storage device 50, the processing device 60, and the input/output interface 70, or a virtual computer formed of a plurality of units of hardware. The functions illustrated in FIG. 5 are implemented through execution of a low-order program by such a computer.

The storage device 50, the processing device 60, and the input/output interface 70 of the low-order system 2 are the same as the storage device 10, the processing device 20, and the input/output interface 30 of the high-order system 1 described with reference to FIG. 2, respectively.

The storage device 50 stores a low-order program, and also stores low-order workflow data 51 and log data 52.

The low-order workflow data 51 is data in which a workflow to be advanced by the low-order system 2 is stored in a computer-readable form. The low-order system 2 refers to the low-order workflow data 51 to advance processing through appropriate determination based on information held by the low-order system 2 or available information.

The log data 52 is log data of processing in the low-order system 2. The log data 52 is updated by a low-order workflow advancing unit 61 described below.

The processing device 60 includes the low-order workflow advancing unit 61 and a notification unit 62.

When the low-order workflow advancing unit 61 receives a processing command from the high-order system 1, the low-order workflow advancing unit 61 advances processing in accordance with the low-order workflow data 51. The low-order workflow advancing unit 61 transmits a device command to the device 3. The low-order workflow advancing unit 61 starts processing in accordance with the processing command from the high-order system 1, and advances the processing in accordance with the low-order workflow data 51. Upon receiving an asynchronous command from the high-order system 1, the low-order workflow advancing unit 61 executes the asynchronous command at an executable timing in the low-order system 2.

When executing the asynchronous command, the low-order workflow advancing unit 61 performs determination as appropriate, and transmits a device command to the device 3 as required. Upon transmission of a device command to the device 3, the low-order workflow advancing unit 61 updates log data including a reason for determining transmission of the device command.

The notification unit 62 functions as an agent for notifying the high-order system 1 of the state in the low-order system 2 during execution of an asynchronous processing command by the low-order system 2. The notification unit 62 may be set by the notice setting unit 22 of the high-order system 1 or may be set voluntarily by the low-order system 2. The content to be notified to the high-order system 1 by the notification unit 62 is set according to an instruction from the notice setting unit 22 of the high-order system 1. The notification unit 62 may be deleted by an instruction from the notice setting unit 22 of the high-order system 1. The notification unit 62 gives notice to the high-order system 1 in accordance with a notice condition set in advance.

When transmission of a device command to the device 3 is detected, the notification unit 62 notifies the high-order system 1 of the identifier of the device 3 to which the device command has been transmitted and the device command. At that time, the notification unit 62 may give notice to the high-order system 1 including a reason for determining transmission of the device command. The notification unit 62 may give notice to the high-order system 1 including not only transmission of the device command but also a response from the device command. A reason for determination may be "the best effort broadband service, the affected number of users is less than 1,000, but since the handling time limit expires, handle with high priority. As this is the first failure handling, automatic handling (device reboot) is selected first", or the like, which is specified from the low-order workflow data 51.

The notification unit 62 may refer to the log data 52 to detect transmission of a device command to the device 3, and notify the high-order system 1 of it. The notification unit 62 monitors the log data 52, and when the log data 52 is updated, if the updated content is a content that should be notified to the high-order system 1, the notification unit 62 notifies the high-order system 1 of it.

(Processing Method)

Figure 6:
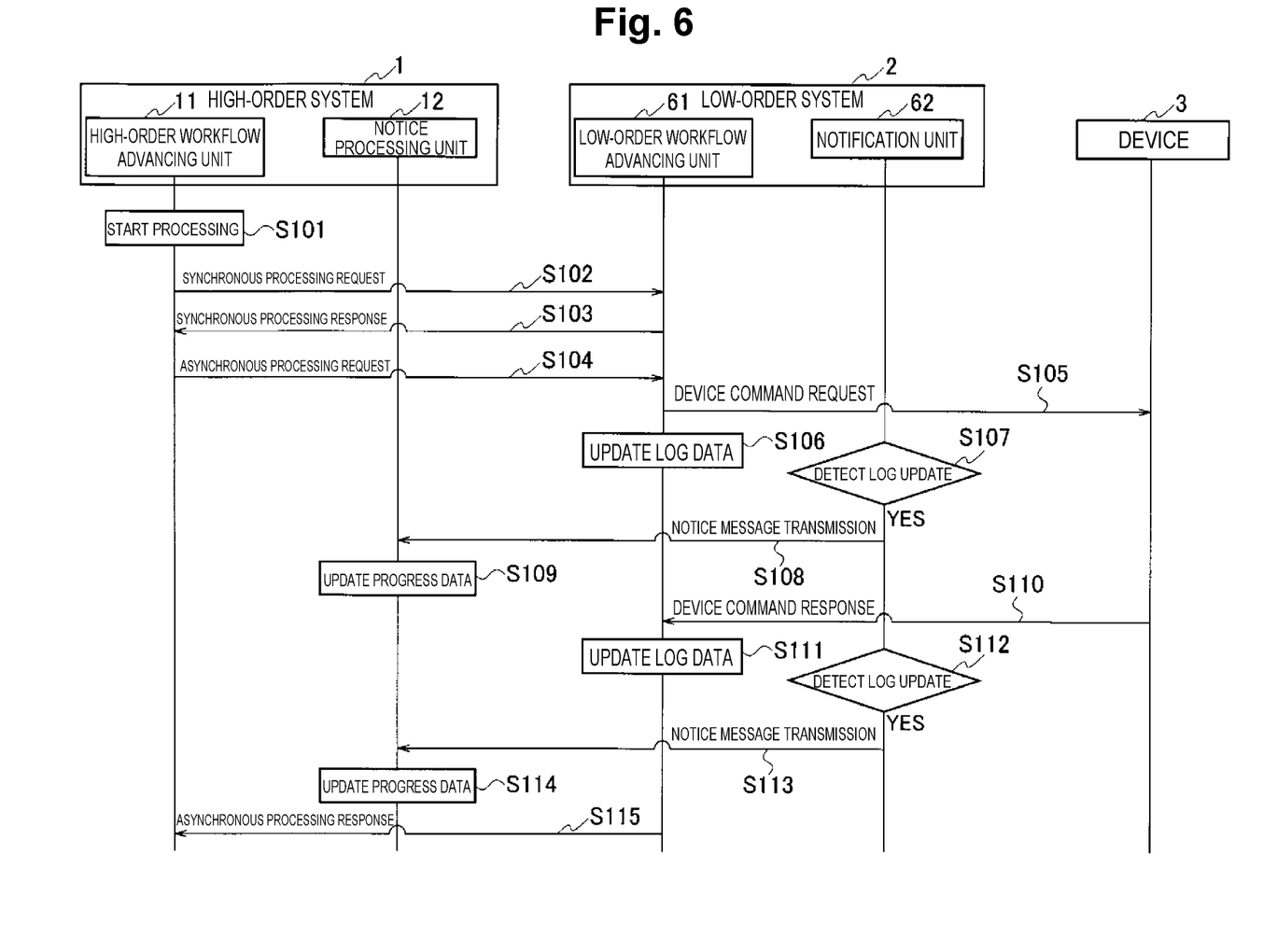
FIG. 6 is a sequence chart illustrating a processing method in a processing system according to an embodiment of the present invention.

A processing method according to the embodiment of the present invention will be described with reference to FIG. 6. In the process illustrated in FIG. 6, the notification unit 62 is set in advance in the low-order system 2.

First, at step S101, the high-order workflow advancing unit 21 starts processing. At step S102, the high-order workflow advancing unit 21 transmits a request for synchronous processing to the low-order system 2. When the processing ends in the low-order system 2, at step S103, the low-order workflow advancing unit 61 transmits a response of the synchronous processing to the high-order workflow advancing unit 21.

At step S104, the high-order workflow advancing unit 21 transmits a request for asynchronous processing. The low-order workflow advancing unit 61 starts processing in accordance with the request for asynchronous processing received at step S104.

At step S105, when the low-order workflow advancing unit 61 requests the device 3 for a device command, the device 3 executes the transmitted device command. Moreover, when requesting the device command, at step S106, the low-order workflow advancing unit 61 records the fact that it requested the device command on the log data 52. Here, at step S107, the notification unit 62 detects that the log data 52 is updated. Moreover, at step S108, the notification unit 62 notifies the high-order system 1 of the fact that a device command is requested.

When the notice processing unit 23 receives a notice message from the notification unit 62, the notice processing unit 23 updates the progress data 13 at step S109. Here, the notice processing unit 23 may convert the device command into a notation word with reference to the dictionary data 12.

At step S110, upon receiving a response to the device command from the device 3, the low-order workflow advancing unit 61 advances processing based on the response content from the device 3. Moreover, upon receiving a response to the device command, at step S111, the low-order workflow advancing unit 61 records the fact that it has received a response to the device command on the log data 52. Here, the notification unit 62 detects that the log data 52 has been updated at step S112. Moreover, at step S113, the notification unit 62 notifies the high-order system 1 of the fact that a response to the device command has been received.

When the notice processing unit 23 receives a notice message from the notification unit 62, the notice processing unit 23 updates the progress data 13 at step S114. Here, the notice processing unit 23 may convert the device command into a notation word with reference to the dictionary data 12.

During handling of the asynchronous processing, processing of steps S105 to S114 is repeated as appropriate. When the asynchronous processing ends, at step S115, the low-order workflow advancing unit 61 notifies the high-order workflow advancing unit 21 of the fact that the asynchronous processing has ended.

Figure 7:
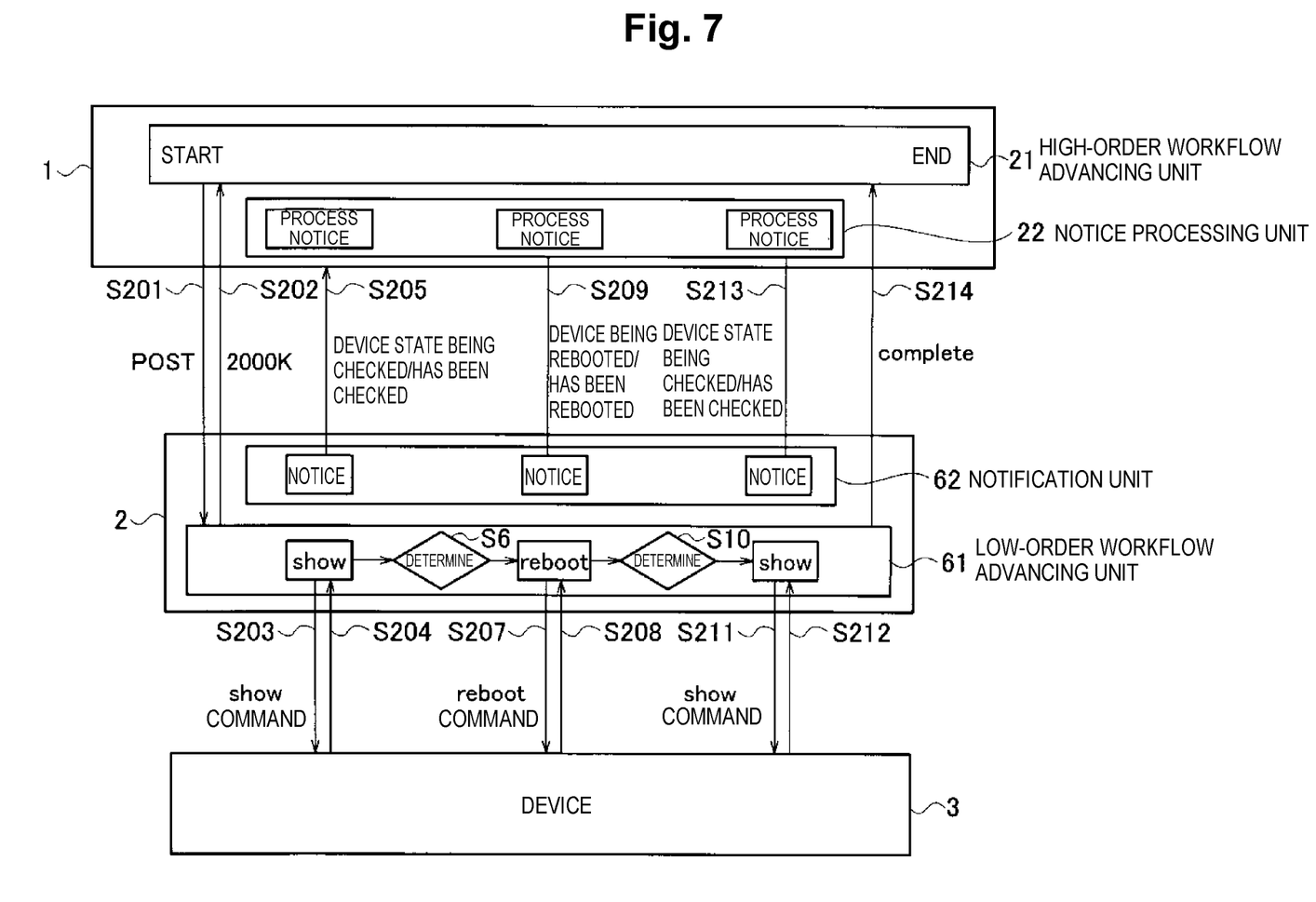
FIG. 7 is a diagram illustrating a relevance between a high-order system and a low-order system according to an embodiment of the present invention.

Exemplary commands of the high-order system 1 and the low-order system 2 will be described with reference to FIG. 7.

At step S201, the high-order workflow advancing unit 21 transmits a POST command to the low-order workflow advancing unit 61. At step S202, the low-order workflow advancing unit 61 transmits a 2000K command to the high-order workflow advancing unit 21 in response to reception of the POST command.

The low-order workflow advancing unit 61 processes the POST command received at step S201. At that time, at step S203, the low-order workflow advancing unit 61 transmits a "show" command to the device 3, and at step S204, receives an execution result of the "show" command from the device 3. When transmitting a "show" command and when receiving an execution result of the "show" command, the low-order workflow advancing unit 61 records the facts on the log data 52.

The notification unit 62 detects that the log data 52 has been updated, and at step S205, gives notice to the notice processing unit 23 of the high-order system 1. When the low-order workflow advancing unit 61 transmits a "show" command to the device 3 at step S203, the notification unit 62 notifies that the device state is being checked. At step S204, when an execution result of the "show" command is returned from the device 3, the notification unit 62 notifies that the device state has been checked.

The low-order workflow advancing unit 61 advances processing in accordance with the low-order workflow data 51, and makes determination at step S206. As a result of determination, at step S207, the low-order workflow advancing unit 61 transmits a "reboot" command to the device 3, and at step S208, receives an execution result of the "reboot" command from the device 3. When transmitting a "reboot" command and when receiving an execution result of the "reboot" command, the low-order workflow advancing unit 61 records the facts on the log data 52.

The notification unit 62 detects that the log data 52 has been updated, and at step S209, gives notice to the notice processing unit 23 of the high-order system 1. When the low-order workflow advancing unit 61 transmits a "reboot" command to the device 3 at step S207, the notification unit 62 notifies that the device is being rebooted. At step S208, when an execution result of the "reboot" command is returned from the device 3, the notification unit 62 notifies that the device has been rebooted.

The low-order workflow advancing unit 61 advances processing in accordance with the low-order workflow data 51, and makes determination at step S210. As a result of determination, at step S211, the low-order workflow advancing unit 61 transmits a "show" command to the device 3, and at step S212, receives an execution result of the "show" command from the device 3. When transmitting a "show" command and receiving an execution result of the "show" command, the low-order workflow advancing unit 61 records the facts on the log data 52.

The notification unit 62 detects that the log data 52 has been updated, and at step S213, gives notice to the notice processing unit 23 of the high-order system 1. When the low-order workflow advancing unit 61 transmits a "show" command to the device 3 at step S211, the notification unit 62 notifies that the device is being rebooted. At step S212, when an execution result of the "show" command is returned from the device 3, the notification unit 62 notifies that the device has been rebooted.

When the processing requested at step S201 ends, at step S214, the low-order workflow advancing unit 61 notifies the high-order workflow advancing unit 21 of a "complete" message saying that the processing has ended, and ends the processing.

As described above, in the processing system 5 according to the embodiment of the present invention, when the high-order system 1 requests the low-order system 2 for an asynchronous processing command, the fact that the low-order system 2 has transmitted and received a device command to and from the device 3 is transmitted from the low-order system 2 to the high-order system 1. Therefore, the high-order system 1 is able to grasp the operating state in the low-order system 2 even in the case of requesting an asynchronous processing command. Moreover, since such information is presented to the operator, the operator can grasp the handling in the processing system 5 from time to time.

Moreover, in the low-order system 2, even in the case of determining issuance of a device command in accordance with the low-order workflow data 51, the reason for determination in the workflow data is notified to the high-order system 1. Therefore, the operator, can grasp the reason for determination based on the SLA in the low-order system 2 from time to time.

As described above, in the processing system 5 according to the embodiment of the present invention, processing of the low-order system can be checked in asynchronous processing.

OTHER EMBODIMENTS

Although the present invention has been described according to the embodiments as above, it should not be understood that description and drawings constituting a part of the present disclosure do not limit the present invention. Various alternative embodiments, examples, and operation techniques will be clearly understood from the present disclosure to those skilled in the art.

For example, the high-order system and the low-order system described in the embodiment of the present invention may be configured on one hardware as illustrated in FIGS. 2 and 5 respectively, or may be configured on a plurality of units of hardware according to the functions and the number of processes.

It is needless to say that the present invention includes various embodiments not described herein. Accordingly, the technical scope of the present invention is defined only by the invention specified matters according to the claims that are reasonable from the above description.

REFERENCE SIGNS LIST

1 high-order system
2 low-order system
3 device
5 processing system
10, 50 storage device
11 high-order workflow data
12 dictionary data
13 progress data
20, 60 processing device
21 high-order workflow advancing unit
22 notice setting unit
23 notice processing unit
24 output unit
30, 70 input/output interface
51 low-order workflow data
52 log data
61 low-order workflow advancing unit
62 notification unit

The invention claimed is:

1. A processing system comprising a high-order system and a low-order system, the high-order system configured to process a high-order workflow and to transmit a processing command to the low-order system, the low-order system configured to process a low-order workflow in accordance with the processing command from the high-order system and to transmit a device command to a device,
the high-order system including:
a storage device configured to store progress data in which an identifier of the device and a device command to be executed by the device are associated with each other;
a high-order workflow advancing unit, including one or more processors, configured to transmit a processing command for asynchronous processing to the low-order system; and
a notice processing unit, including one or more processors, configured to receive, from the low-order system, a notice related to the device command to be executed by the device in the asynchronous processing, and update the progress data, the low-order system including:
a low-order workflow advancing unit, including one or more processors, configured to transmit, upon receiving the processing command from the high-order system, the device command to the device; and
a notification unit, including one or more processors, configured to notify, when transmission of the device command to the device is detected, the high-order system of the identifier of the device to which the device command was transmitted and the device command.

2. The processing system according to claim 1, wherein
the storage device of the high-order system is configured to store dictionary data in which the identifier of the device, the device command of the device, and a notation word of the device command are associated with one another, and
the notice processing unit is configured to converts the device command received from the low-order system into the notation word, and update the progress data.

3. The processing system according to claim 1, wherein
the low-order workflow advancing unit is configured to update log data upon transmission of the device command to the device, and
the notification unit is configured to refer to the log data to detect the transmission of the device command to the device.

4. A processing method used in a processing system including a high-order system and a low-order system, the high-order system processing a high-order workflow and transmitting a processing command to the low-order system, the low-order system processing a low-order workflow in accordance with the processing command from the high-order system and transmitting a device command to a device, the processing method comprising:
by the high-order system, transmitting a processing command for asynchronous processing to the low-order system;
by the low-order system, upon receiving the processing command from the high-order system, transmitting a device command to the device;
when transmission of the device command to the device is detected, by the low-order system, notifying the high-order system of an identifier of the device to which the device command was transmitted and the device command, and
by the high-order system, receiving, from the low-order system, a notice related to the device command to be executed by the device in the asynchronous processing, and updating progress data in which the identifier of the device and the device command to be executed by the device are associated with each other.

5. The processing method according to claim 4, further comprising:
storing, by the high-order system, dictionary data in which the identifier of the device, the device command of the device, and a notation word of the device command are associated with one another, and
converting, by the high-order system, the device command received from the low-order system into the notation word, and updates the progress data.

6. The processing method according to claim 4, further comprising:
  updating, by the low-order workflow advancing unit, log data upon transmission of the device command to the device, and
  referring to the log data to detect the transmission of the device command to the device.

7. A non-transitory computer readable medium storing one or more instructions causing a computer to execute:
  processing a high-order workflow in a processing system, wherein the processing system includes a high-order system and a low-order system;
  transmitting a processing command to the low-order system, the low-order system processing a low-order workflow in accordance with the processing command from the high-order system and transmitting a device command to a device, further comprising:
    by the high-order system, transmitting a processing command for asynchronous processing to the low-order system;
    by the low-order system, upon receiving the processing command from the high-order system, transmitting a device command to the device;
    when transmission of the device command to the device is detected, by the low-order system, notifying the high-order system of an identifier of the device to which the device command was transmitted and the device command, and
    by the high-order system, receiving, from the low-order system, a notice related to the device command to be executed by the device in the asynchronous processing, and updating progress data in which the identifier of the device and the device command to be executed by the device are associated with each other.

8. The non-transitory computer readable medium according to claim 7, further comprising:
  storing, by the high-order system, dictionary data in which the identifier of the device, the device command of the device, and a notation word of the device command are associated with one another, and
  converting the device command received from the low-order system into the notation word, and updates the progress data.

9. The non-transitory computer readable medium according to claim 7, further comprising:
  updating, by the low-order system, log data upon transmission of the device command to the device, and
  referring, by the low-order system, to the log data to detect the transmission of the device command to the device.

* * * * *